US011697740B2

(12) United States Patent
Deegan et al.

(10) Patent No.: US 11,697,740 B2
(45) Date of Patent: Jul. 11, 2023

(54) PRIMER COMPOSITIONS FOR INJECTION MOLDING (71) Applicant: Henkel AG & Co. KGaA, Duesseldorf (DE)

(72) Inventors: Brian Deegan, Dublin (IE); Darren Nolan, Dublin (IE); Brendan Kneafsey, Dublin (IE); Mark Loane, Dublin (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 77 days.

(21) Appl. No.: 16/922,065

(22) Filed: Jul. 7, 2020

(65) Prior Publication Data

US 2020/0339823 A1   Oct. 29, 2020

Related U.S. Application Data (60) Division of application No. 15/938,547, filed on Mar. 28, 2018, now abandoned, which is a continuation of application No. PCT/EP2016/071732, filed on Sep. 14, 2016.

(30) Foreign Application Priority Data

Sep. 28, 2015   (GB) ...................... 1517106

(51) Int. Cl.
| | |
|---|---|
| C09D 4/06 | (2006.01) |
| B29C 45/18 | (2006.01) |
| C08F 2/48 | (2006.01) |
| C08F 212/08 | (2006.01) |
| C08F 220/06 | (2006.01) |
| C08F 220/18 | (2006.01) |
| C08F 220/28 | (2006.01) |
| C09D 5/00 | (2006.01) |
| C09D 153/02 | (2006.01) |
| C08F 285/00 | (2006.01) |
| C08F 287/00 | (2006.01) |
| B29C 45/14 | (2006.01) |
| B29K 23/00 | (2006.01) |
| B29K 705/02 | (2006.01) |
| B29K 709/08 | (2006.01) |

(52) U.S. Cl.
CPC ........ *C09D 5/002* (2013.01); *B29C 45/14311* (2013.01); *C08F 220/281* (2020.02); *C08F 285/00* (2013.01); *C08F 287/00* (2013.01); *C09D 4/06* (2013.01); *C09D 153/025* (2013.01); *B29K 2023/00* (2013.01); *B29K 2705/02* (2013.01); *B29K 2709/08* (2013.01); *C08F 220/1811* (2020.02)

(58) Field of Classification Search
None
See application file for complete search history.

(56) References Cited

U.S. PATENT DOCUMENTS

| | | | |
|---|---|---|---|
| 4,258,123 A | 3/1981 | Nagashima et al. | |
| 4,505,793 A | 3/1985 | Tamoto et al. | |
| 5,112,911 A | 5/1992 | Mori et al. | |
| 5,302,653 A | 4/1994 | Nishio et al. | |
| 5,395,862 A | 3/1995 | Neckers et al. | |
| 5,399,770 A | 3/1995 | Leppard et al. | |
| 5,451,343 A | 9/1995 | Neckers et al. | |
| 5,545,676 A | 8/1996 | Palazzotto et al. | |
| 5,605,999 A | 2/1997 | Chu et al. | |
| 5,677,376 A | 10/1997 | Groves | |
| 6,086,138 A * | 7/2000 | Xu | B60J 1/10 296/146.15 |
| 6,089,646 A * | 7/2000 | Xu | B60J 1/10 296/146.15 |
| 6,293,609 B1 * | 9/2001 | Xu | B60J 1/10 296/146.15 |
| 2004/0242721 A1 | 12/2004 | Muyldermans et al. | |
| 2005/0014901 A1 | 1/2005 | Osae et al. | |
| 2010/0304104 A1 | 12/2010 | Nagasaki et al. | |

FOREIGN PATENT DOCUMENTS

| | | |
|---|---|---|
| CN | 1556776 A | 12/2004 |
| CN | 102317393 A | 1/2012 |
| CN | 102405137 | 4/2012 |
| CN | 104342041 A | 2/2015 |
| EP | 0193126 A1 | 9/1986 |

(Continued)

*Primary Examiner* — Sheeba Ahmed
(74) *Attorney, Agent, or Firm* — Steven C. Bauman (57) ABSTRACT A curable primer composition comprising:(a) a curable component such as methacrylate; (b) a cure initiating component; and (c) a polymer material selected from the group consisting of: (i) block polymers represented by S-A-S where S is polystyrene and A stands for a polymer or copolymer formed from one or more of ethylene, propylene, butylene, and styrene, which are optionally substituted with carboxylic acid or maleic anhydride; provided that when A comprises styrene then A is a copolymer of styrene with at least one of ethylene, propylene and butylene, and is optionally substituted with carboxylic acid or maleic anhydride; and (ii) polystyrene-poly(ethylene-propylene) ("SEP"); and (iii) any combination of said polymer materials. The composition is applied to a part then photocured. It is dry to touch. Thereafter a thermoplastic material such as a polyolefin is overmolded (e.g. injection molded) over the applied composition. It enhances bond strength of the polyolefin to the part.

19 Claims, 2 Drawing Sheets (56) References Cited

FOREIGN PATENT DOCUMENTS

| | | |
|---|---:|---|
| EP | 0369645 A1 | 5/1990 |
| EP | 0563925 A1 | 10/1993 |
| JP | 70290897 A | 11/1995 |
| JP | 2002-226509 A | 8/2002 |
| JP | 2003-12880 A | 1/2003 |
| JP | 2003-94561 A | 4/2003 |
| JP | 2005146177 A | 6/2005 |
| JP | 2007-002167 A | 1/2007 |
| JP | 2007-56087 A | 3/2007 |
| JP | 2010077384 A | 4/2010 |
| JP | 4485172 B2 | 6/2010 |
| JP | 2018-127614 A | 8/2018 |
| WO | 0202703 A1 | 1/2002 |
| WO | 03011787 A2 | 2/2003 |
| WO | 03035779 A1 | 5/2003 |
| WO | 2014113470 A1 | 7/2014 |
| WO | 2014118213 | 8/2014 |
| WO | 2014119341 A1 | 8/2014 |
| WO | 2014193903 A2 | 12/2014 |

\* cited by examiner

PRIMER COMPOSITIONS FOR INJECTION MOLDING

FIELD

The present invention relates to curable compositions, which may be cured by way of exposure to radiation in the electromagnetic spectrum, for use as a primer composition for injection molding applications.

BACKGROUND

Presently, there is a drive to streamline the manufacturing process in numerous markets, but especially for hand held consumer electronics. To this end, it would be desirable to eliminate the often slow and sometimes costly process of joining plastic parts to other substrates such as metal frames and glass displays with traditional adhesives, in what is called an overmolding process.

Another drawback to the use of these types of adhesives is that the on-part work life before overmolding is short and therefore does not lend itself to a separate offline process from the main overmolding assembly process. In other words, it becomes impractical to perform a B stage process with these traditional adhesives on the part to be overmolded prior to use in the overmolding assembly process.

One composition that sets out to address this need is described in International Publication No. WO 2014/193903 which discloses a photocurable primer composition, comprising: a (meth)acrylate monomer component; a photoinitiator component; and a rubber component comprising a polyvinyl butyral component having a molecular weight of less than about 120,000 MW or an acrylonitrile butadiene styrene copolymer, and optionally a core shell rubber having a mean diameter in the range of about 100 to about 300 nm.

Other compositions are described in JP2005146177, JP4485172, and WO200202703, all to Mistui Chemicals and WO2014118213, to Evonik Industries.

The need still exists for alternative primer compositions for use in an overmolding assembly process that provide adequate bond strength.

Bonding polyolefinic plastics to substrates (such as metals or glass) can be accomplished by conventional adhesives such as wet adhesives (e.g. 2K acrylics) or PSA tapes. Such methods can be employed when bringing two pre-formed substrates together such as a polyolefin castings to a metal surface in car bumper assemblies.

Polyolefins are perceived as "difficult to bond" substrates, in part due to their low surface energy, and in part due to their being non-polar, non-porous and to a great extent chemically inert. Accordingly, a need also exists for alternative compositions that can bond polyolefins to other substrates for example metal or glass substrates.

SUMMARY

In one aspect, the present invention provides a curable primer composition comprising:
(a) a curable component;
(b) a cure initiating component; and
(c) a polymer material selected from the group consisting of:
(i) block polymers represented by S-A-S where S is polystyrene and A stands for a polymer or copolymer formed from one or more of ethylene, propylene, butylene and styrene, which are optionally substituted with carboxylic acid or maleic anhydride, provided that when A comprises styrene then A is a copolymer of styrene with at least one of ethylene, propylene and butylene and is optionally substituted with carboxylic acid or maleic anhydride; and
(ii) polystyrene-poly(ethylene-propylene) ("SEP"); and
(iii) any combination of said polymer materials.

Component (c) is a copolymer, and thus a composition where A does not differ from S, such as when the S-A-S material is polystyrene (i.e. S and A are each polystyrene), is not within the present invention.

It is desirable that a composition of the invention includes materials that are of the formula S-A-S.

Accordingly the present invention provides a curable composition comprising the components (a) to (c) as set out above where the polymer material is selected from block polymers represented by S-A-S where S is polystyrene and A stands for a polymer or copolymer formed from one or more of ethylene, propylene, butylene and styrene which are optionally substituted with carboxylic acid or maleic anhydride, provided that when A comprises styrene then A is a copolymer of styrene with at least one of ethylene, propylene and butylene, and is optionally substituted with carboxylic acid or maleic anhydride; and any combination of said polymer materials.

Accordingly, the component (c) is not simply polystyrene.

The present invention provides a curable composition (adhesive) which can be applied to a (rigid) substrate (such as metal or glass), yielding a tack-free coating. The curable composition has a specific on-part life. The coated part can then be overmolded with a polyolefin material such as a polyolefinic plastic (for example polypropylene) via any suitable process, for example an injection molding process. This yields a substrate to polyolefin part. This part will have a desired structural strength. The compositions of the invention when cured form a bond between the polyolefin material and the substrate which is durable. For example a bond formed using a composition of the invention has resistance to factors such as humidity, impact and tensile stress.

With the present invention a plastic substrate can be formed whilst substantially simultaneously creating a bond to another substrate such as a rigid substrate. This circumvents the need for a pre-molded plastic part to be made and then bonded to the other substrate in two distinct steps.

It is desirable that A is formed from one or more of ethylene, propylene, butylene and styrene, provided that A is not formed from styrene alone.

Suitable compositions of the present invention include those where A is formed from at least two, desirably three, of ethylene, propylene, butylene and styrene.

The component (c) may be selected from
polystyrene-poly(ethylene-propylene)-polystyrene ("SEPS");
polystyrene-poly(ethylene-butylene)-polystyrene ("SEBS");
polystyrene-poly(ethylene-butylene-styrene)-polystyrene ("S(EBS)S"); and combinations thereof.

Suitably, component (c) polymer comprises from about 10 to about 70 weight percent of styrene based on the total weight of polymer. The component (c) polymer may comprise from about 15 to about 60 weight percent of styrene based on the total weight of polymer. Optionally the component (c) may comprise from about 20 to about 60 weight percent of styrene based on the total weight of polymer.

These materials are of particular interest in the present invention as they confer good bond strength between a polyolefin that is subsequently overmolded and a substrate such as a metal substrate.

A may be substituted with carboxylic acid groups and/or maleic anhydride groups. Those substituted with maleic anhydride groups may be of particular interest.

Desirably the material S-A-S is at least one of polystyrene-poly(ethylene-butylene)-polystyrene ("SEBS"); and polystyrene-poly(ethylene-butylene-styrene)-polystyrene ("S(EBS)S"). These materials may be optionally substituted with carboxylic acid groups and/or maleic anhydride groups.

It is to be noted that any or each carboxylic acid may be formed from maleic anhydride, for example by hydrolysis. The carboxylic acid may be saturated or unsaturated. The carboxylic acid may be a $C_1$ to $C_{10}$ carboxylic acid for example a $C_4$ carboxylic acid.

A should have no unsaturated carbon-carbon bonds.

Compositions of the invention give better bonding performance.

These compositions include materials, where the S-A-S is at least one of:
- polystyrene-poly(ethylene-propylene)-polystyrene ("SEPS");
- polystyrene-poly(ethylene-butylene)-polystyrene ("SEBS");
- polystyrene-poly(ethylene-butylene-styrene)-polystyrene ("S(EBS)S"); and
- polystyrene-poly(ethylene-ethylene/propylene)-polystyrene ("SEEPS"). The notation ethylene/propylene indicates ethylene propylene units that are copolymerized with other units. The notation ethylene-ethylene/propylene indicates a copolymer of (i) ethylene units with (ii) ethylene propylene units.

Desirably the materials of the invention (having no unsaturated carbon-carbon bonds) include the following, where the material S-A-S at least one of:
- polystyrene-poly(ethylene-propylene)-polystyrene ("SEPS");
- polystyrene-poly(ethylene-butylene)-polystyrene ("SEBS"); and
- polystyrene-poly(ethylene-butylene-styrene)-polystyrene ("S(EBS)S").

The SEP material may be represented by:

where PS is shorthand for polystyrene and represents poly(ethylene-propylene). m is an integer greater than or equal to 2. Poly(ethylene-propylene) indicates a co-polymer composed of (i) ethylene units and (ii) propylene units.

The SEPS material may be represented by:

where PS is shorthand for polystyrene and represents poly(ethylene-propylene). m is an integer greater than or equal to 2. Poly(ethylene-propylene) indicates a co-polymer composed of (i) ethylene units and (ii) propylene units.

The SEBS material may be represented by:

where PS is shorthand for polystyrene, and represents poly(ethylene-butylene). m, n and o are integers greater than or equal to 1. When m and n are 1, o is greater than or equal to 2. Poly(ethylene-butylene) indicates a co-polymer composed of (i) ethylene units and (ii) butylene units.

The SEEPS material may be represented by:

where PS is shorthand for polystyrene, and represents poly(ethylene-ethylene/propylene). m, n and o are integers greater than or equal to 1. When m and n are 1, o is greater than or equal to 2. Poly(ethylene-ethylene/propylene) indicates a co-polymer composed of (i) ethylene units and (ii) ethylene/propylene units.

In each of the above structures m, n and o are integers greater than or equal to 1. In the above structures when m and n are 1, o is greater than or equal to 2. Each polymer comprises from about 10 to about 70 weight percent styrene based on the total weight of polymer. Preferably the polymer comprises from about 15 to about 60 weight percent styrene based on the total weight of polymer.

Materials with unsaturated carbon-carbon bonds including the following did not perform well in testing: polystyrene-polybutadiene ("SB"); polystyrene-polybutadiene-polystyrene ("SBS"); polystyrene-polyisoprene-polystyrene ("SIS"); and polystyrene-poly(isoprene-butadiene)-polystyrene ("SIBS"). These materials were tested and form comparative examples in Table 1 below.

As seen from the Examples below, good results in terms of bond strength were obtained with the S-A-S type materials, in particular SEBS (e.g. H1517 at 8.1 MPa) and S(EBS)S (e.g. A1535, 7.2 MPa).

Materials that also performed well are, maleic anhydride grafted saturated S-A-S type polymers, such as maleic anhydride grafted SEBS (e.g. FG1901, 6.3 MPa).

SEP performed well also (e.g. G1730, 2.3 MPa).

No significant bonding was observed with the comparative unsaturated type materials.

Within the groups shore A value greater than 60 is preferred (e.g. 502T [in table] is 30% styrene, shore A of 43, and gives a bond of 4.6 MPa, similar product of H1041 [also in table] has same 30% styrene but has shore A of 84 and bond strength improved to 5.7 MPa)

The metal substrate to be bonded may be aluminium including aluminium clad materials including those referred to as Al-clad which are of a type with aluminium on an aluminium alloy core, or steel such as stainless steel.

The present invention provides a novel formulation which has excellent bonding capabilities for overmolding substrates (such as aluminium including anodised aluminium, zinc dichromate) with polyolefinic plastics (such as PP and HDPE) via a molding process such as an injection molding process.

The invention provides a curable composition optionally in the form of a UV curable adhesive which when cured on-part yields a tack-free rigid coating optionally in the form of a film. The coating typically has an on-part life of at least 24 hours.

The adhesive system desirably comprises a UV cure system with a base of acrylate monomers (e.g. THFA and IBOA).

The coated part can then be overmolded, e.g. via injection molding, with a polyolefinic plastic (e.g. PE) to yield a bonded plastic to substrate assembly.

The invention extends to use of a composition of the invention as a primer on a substrate to be bonded to a thermoplastic material, for example a polyolefin material.

In a further aspect is provided a combination comprising: the composition of the invention; and a thermoplastic, for example polyolefin, plastic.

The invention also provides a substrate having coated as a layer on at least a surface thereof the cure product of a composition according to the invention wherein the cure product is in a B stage, optionally for subsequent bonding to a thermoplastic material, for example a polyolefin material.

In a still further aspect is provided a combination comprising: an article having coated as a layer on at least a surface thereof a B-staged version of the composition of the invention; and a thermoplastic, for example polyolefin, plastic in contact with the B-staged version of the composition.

In an additional aspect is provided a process for forming an injection molding about an article, comprising the steps of disposing into an injection molding cavity an article about which a thermoplastic, for example polyolefin, plastic material is to be molded into a shape; and injecting into the injection molding cavity in which is disposed the article the thermoplastic, for example polyolefin, plastic material at a temperature and pressure to permit the material to flow around and about the article in the mold and maintaining the mold under a temperature and pressure appropriate to permit the thermoplastic, for example polyolefin, plastic material to solidify, where prior to disposition of the article, the article is primed with the composition of any of the foregoing aspects and exposed to radiation in the electromagnetic spectrum appropriate to cure the composition.

The polyolefin material is desirably a polyolefin-based thermoplastic material such as at least one of a polyolefin-based thermoplastic elastomer, polyethylene (PE), and polypropylene (PP).

The article may be constructed from glass and aluminium such as anodized aluminium.

As the component (a), a (meth)acrylate is the most common choice. The (meth)acrylate may be selected from one or more of a wide variety of materials, such as those represented by $H_2C=CGCO_2R^1$ where G may be hydrogen or alkyl groups having from 1 to about 4 carbon atoms, and R1 may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like. Examples include N,N-dimethyl acrylamide, phenoxy ethyl(meth)acrylate, tetrahydrofurfuryl (meth)acrylate, cyclohexyl (meth)acrylate, isobornyl (meth)acrylate, butyl (meth)acrylate, hydroxyethyl (meth)acrylate, and hydroxypropyl (meth)acrylate.

Additional (meth)acrylates suitable for use herein include polyfunctional (meth)acrylates, such as, but not limited to, di-or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Still other (meth)acrylates that may be used herein include silicone (meth)acrylates ("SiMA"), such as those taught by and claimed in U.S. Pat. No. 5,605,999 (Chu), the disclosure of which is hereby expressly incorporated herein by reference.

Of course, combinations of these (meth)acrylates may also be used. Though desirably, the (meth)acrylate component is selected from one or more of N,N-dimethyl acrylamide, phenoxy ethyl(meth)acrylate, tetrahydrofurfuryl (meth)acrylate, cyclohexyl (meth)acrylate, isobornyl (meth)acrylate, butyl (meth)acrylate, hydroxyethyl (meth)acrylate, and hydroxypropyl (meth)acrylate.

The (meth)acrylate component should comprise from about 10% to about 90% by weight, such as about 40% to about 80% by weight, based on the total weight.

The material S-A-S may be present in a B stage cure product of the composition, in an amount from about 5% to about 80% based on the total weight of the composition, for example from about 30% to about 60% by weight based on the total weight of the composition. The composition of the invention may be applied using a carrier such as a solvent, which, for the purposes of the weight percentages given here and in the claims is not included. (In the experimental work below the weight of a solvent is included in the overall weight of the composition, but this is before cure, and the solvent is not part of the cure product, e.g. UV cure product.) The removal of the solvent (and thus the weight calculation difference) between the initial composition and the B stage cure product has thus been taken into account. For the other components in the experimental work below the weight percentage is calculated taking account of the solvent.

The material S-A-S desirably has a Shore A hardness of 20 to 100, for example from about 60 to 100.

The cure initiating component may be a photoinitiator component. The photoinitiator may be selected from one or more of initiators triggered by radiation in the ultraviolet region of the electromagnetic spectrum, the visible region of the electromagnetic spectrum, or both.

The photoinitiator may be a benzophenone or substituted benzophenone, such as, for example, an α-hydroxyketone. One particularly suitable α-hydroxyketone is 1-hydroxy-cyclohexyl-phenyl-ketone (commercially available as IRGACURE 184 from Ciba Specialty Chemicals, Inc.). Other suitable α-hydroxyketones and blends thereof include: 2-hydroxy-2-methyl-1-phenyl-propan-1-one (DAROCUR 1173); 2-hydroxy-1-[4-(2-hydroxyethoxy)phenyl]-2-methyl-1-propanone (IRGACURE 2959); and blends such as IRGACURE 1000 and IRGACURE 500 (all commercially available from Ciba Specialty Chemicals, Inc.). Other suitable UV photoinitiators include: acetophenone and substituted acetophenones; benzoin and its alkyl esters; xanthone and substituted xanthones; diethoxy-acetophenone; benzoin methyl ether; benzoin ethyl ether; benzoin isopropyl ether; diethoxyxanthone; chloro-thioxanthone; N-methyl diethanol-amine-benzophenone; 1-benzoyl cyclohexanol; 2-benzyl-2-(dimethylamino)-1-[4-(4-morpholinyl)phenyl]-1-1-butanone; amino ketones, such as IRGACURE 907, IRGACURE 369 and IRGACURE 1300 (all commercially available from Ciba Specialty Chemicals, Inc.); benzildimethyl-ketals, such as IRGACURE 651 (commercially available from Ciba Specialty Chemicals, Inc.); BAPO (bis acyl phosphine oxide) and blends thereof, such as IRGACURE 819, IRGACURE 1700, IRGACURE 1800, IRGACURE 1850, and DAROCUR 4265 (all commercially available from Ciba Specialty Chemicals, Inc.); 2,4,6 trimethylbenzoyldiphosphine oxide with or without 1-hydroxy-cyclohexyl-phenyl ketone, metallocenes, such as IRGACURE 784 and IRGACURE 261 (both commercially available from Ciba Specialty Chemicals, Inc.); benzophenones, such as DAROCUR BP (commercially available from Ciba Specialty Chemicals, Inc.); and mixtures thereof.

U.S. Pat. No. 5,399,770 discloses and claims a class of compounds functional as such photoinitiators. Thus, the, disclosure of the '770 patent is hereby express incorporated herein by reference in its entirety. A particularly desirable photoinitiator embraced by the 770 patent is available commercially from Ciba Specialty Chemicals under the trade name IRGACURE 819. IRGACURE 819 is bis(2,4,6-trimethyl benzoyl)phenyl phosphine oxide.

Camphorquinone peroxyester initiators; 9-fluorene carboxylic acid peroxyesters; dl-camphorquinone; IRGACURE 784DC (photoinitiator based on substituted titanocenes); two-component initiators including a dye and electron donor; three-component initiators including a dye, electron donor and oxidant; and combinations thereof, may also be used. These visible light photoinitiators may be used in conjunction with bisacyl phosphine oxide photoinitiators to achieve the desired effect.

As regards two component initiators, suitable dyes include, but are not limited to camphorquinone, 5,7-diiodo-3-butoxy-6-fluorone, rose bengal, riboflavin, eosin Y, benzil, fluorone dyes, benzil derivatives, ketocoumarins, acridine dyes, benzoflavin and combinations thereof, and suitable electron donors include, but are not limited to methyldiethanolamine, dimethyl-p-toluidine, N,N-dimethylaminoethyl methacrylate, ethyl 4-dimethylaminobenzoate and combinations thereof.

And as regards three component initiators, in addition to the two components noted above, as the third component suitable oxidants include, but are not limited to bis(trichloromethyl)triazines, onium salts and combinations thereof. Examples of onium salts include sulfonium and iodonium salts.

Other suitable visible photoinitiator systems include those disclosed in each of the following patents or publications, each of which is incorporated by reference herein in its entirety. U.S. Pat. No. 4,505,793, which is incorporated by reference herein, discloses photopolymerization initiators that include a combination of a 3-keto-substituted coumarin compound and an active halogen compound. A number of exemplary compounds are disclosed. Such photopolymerization initiators cure by exposure to light having wavelengths ranging between about 180 nm and 600 nm. U.S. Pat. No. 4,258,123, which is incorporated by reference herein, discloses photosensitive resin compositions including initiator components that generate a free radical upon irradiation with actinic light. Such components include various triazine compounds, as more fully described therein.

European Patent Publication No. EP 0 369 645 A1 discloses a three-part photoinitiator system which includes a trihalomethyl substituted-s-triazine, a sensitizing compound capable of absorbing radiation in the range of about 300-1000 nm and an electron donor. Exemplary sensitizing compounds are disclosed, including: ketones; coumarin dyes; xanthene dyes; 3H-xanthen-3-one dyes; acridine dyes; thiazole dyes; thiazine dyes; oxazine dyes; azine dyes; aminoketone dyes; methane and polymethine dyes; porphyrins; aromatic polycyclic hydrocarbons; p-substituted aminostyryl ketone compounds; aminotriaryl methanes; merocyanines; squarylium dyes; and pyridinium dyes. Exemplary donors also are disclosed, including: amines; amides; ethers; ureas; ferrocene; sulfinic acids and their salts; salts of ferrocyanide; ascorbic acid and its salts; dithiocarbamic acid and its salts; salts of xanthates; salts of ethylene diamine tetraacetic acid; and salts of tetraphenylboronic acid. Such initiators are sensitive to both UV and visible light.

European Patent Publication No. EP 0 563 925 A1 discloses photopolymerization initiators including a sensitizing compound that is capable of absorbing radiation in the range of about 250-1000 nm and 2-aryl-4,6-bis(trichloromethyl)-1,3,5-triazine. Exemplary sensitizing compounds that are disclosed include dyes such as cyanine, merocyanine, coumarin, ketocoumarin, (thio)xanthene, acridine, thiazole, thiazine, oxazine, azine, aminoketone, squarylium, pyridinium, (thia)pyrylium, porphyrin, triaryl methane, (poly)methine, amino styryl compounds and aromatic polycyclic hydrocarbons. These photopolymerization initiators are sensitive to UV and visible light.

U.S. Pat. No. 5,395,862, which is expressly incorporated by reference herein, discloses fluorone photoinitiators, which are sensitive to visible light. Such fluorone initiator systems also include a co-initiator, which is capable of accepting an electron from the excited fluorone species. Exemplary co-initiators are disclosed, including: onium salts, nitrohalomethanes and diazosulfones. U.S. Pat. No. 5,451,343, which is incorporated herein by reference, discloses fluorone and pyronin-Y derivatives as initiators that absorb light at wavelengths of greater than 350 nm. U.S. Pat. No. 5,545,676, which is incorporated by reference herein, discloses a three-part photoinitiator system, which cures under UV or visible light. The three-part system includes an arylidonium salt, a sensitizing compound and an electron donor. Exemplary iodonium salts include diphenyliodonium salts.

2,4,6 trimethylbenzoyldiphosphine oxide and 1-hydrocyclohexyl-phenyl ketone are two particularly desirable photoinitiators for use in the compositions.

The photoinitiator component should be present in an amount of about 1 to about 5 weight percent.

The inventive composition may be used as a primer for an article which is to be subjected to an overmolding process in which an injection molding is to be formed about the article. The article may be constructed from a variety of substrates, though glass and aluminium are the preferred choices, with anodized aluminium being a particularly desirable choice.

The inventive composition may be applied to the article to be overmolded and then exposed to radiation in the electromagnetic spectrum in order to fix the composition on at least a portion of the surface of the article.

The composition may be applied to the article in any of several ways, such as spraying, screen printing, touch transfer and the like. After application it is cured (or B staged) to a dry-to-the-touch (or tack free) surface by exposure to energy in the electromagnetic spectrum, such as UV or UV/visible radiation.

This B staging permits the primer coated article to be stored for later use in the overmolding process.

Then in the overmolding process, the primer coated article is disposed into an injection molding cavity and the cavity closed in order to receive the thermoplastic resin to be injected therein under elevated temperature and/or pressure conditions.

The thermoplastic material e.g. resin is ordinarily chosen from polyolefin materials such as polyethylene and polypropylene.

The thermoplastic resin should be injected into the molding cavity at an elevated temperature and pressure; suitable to completely mold the finished assembly in 0.5-5 seconds. The temperature time and pressure will depend on the particular thermoplastic as well as the size, geometry and path length of the mold cavity. Typical temperatures will be in the range of about 180° C. to 300° C., such as 260° C. and pressures of 50 to 5000 psi, such as 500 psi. The flow rate must be suitable to fill the entire mold cavity before the thermoplastic reaches a no-flow state.

Figure 1:
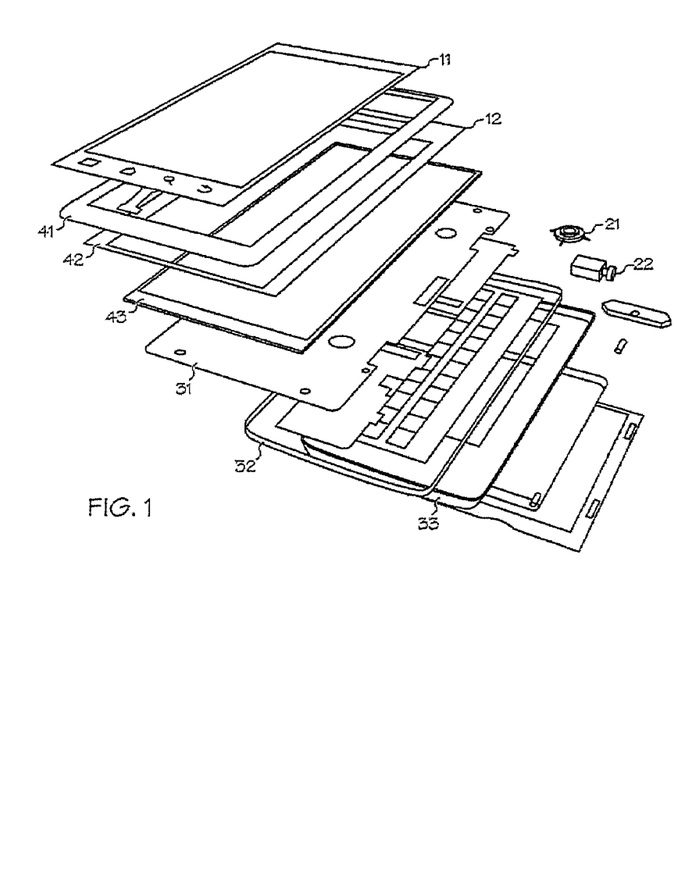
FIG. 1 depicts an exploded view of various component layers of a hand held consumer electronic display device, about which overmolding may be used as the interface therebetween.

An example of one or more articles that may be formed by the overmolding process so described may be seen with reference to FIG. 1. There, several articles that are used in the assembly of hand held consumer electronic devices are highlighted as benefiting from the so disclosed overmolding technology. More specifically, four articles may be prepared with the so-disclosed overmolding technology: 1. touch panel window 11 and cover 12; 2. speaker 21 and camera lens 22; 3. cover 31, metal trim 32 and subframe 33; and 4. touch panel 41, plastic bezel 42 and metal trim 43.

BRIEF DESCRIPTION OF THE DRAWINGS

Embodiments of the invention will be described, by way of example only, with reference to the accompanying drawings in which.

DETAILED DESCRIPTION

A polyolefin pin of diameter 12.65 to 12.675 mm and a minimum of 37.5 mm length is injection molded onto a metal or glass plate 101.6 mm×25.4 mm and thickness from 1.0 to 5.5 mm. The injection molding machine used was a Travin MINI MOULDER TP1, the barrel temperature used was 220° C., and the mold was unheated. The glass or metal plate has already been provided with a cured coating of the test formulation covering the surface. This coating is a B-staged version of the composition. It has been cured with a first cure mechanism, which is UV light, but can react when subsequently contacted with the melted thermoplastic, e.g. polyolefin. The coating thus has the material from the pin molded thereon.

The test plastic used in the results below is polypropylene (sold under the trade name) TATREN IM 25 75, and the solid substrate used in the reported data is an anodised aluminium plate 101.6 mm×25.4 mm and thickness of 1.6 mm.

This pin is pulled in a tensile test 24 hours after bonding at a rate of 2.0 mm/min using a Hounsfield tensile testing machine with a calibrated 5 kN load cell attached.

Table 1 below is a list of additives that were tested in formulations specified in the Examples below. These compositions were applied to anodised aluminium and cured. Polypropylene was then injected moulded onto the cured films. The bond strengths measured at 24 hours post-bonding are included for each.

TABLE 1

| Example Number | Bond Strength Achieved with PP to Anodised Aluminium | Manufacturer | Product Name | Polymer Material | % S in Polymer | Hardness (shore A) |
|---|---|---|---|---|---|---|
| 1 | 0.0 | DuPont | VCS5500 | VAMAC (Ethylene Acrylic Elastomer) | 0 | |
| 2 | 0.0 | Nippon Paper | Auroren 150S | maleic anhydride grafted PE | 0 | |
| 3 | 0.0 | Mitsubishi Chemicals | Polytail H | polyhydroxy Hydrogenated Polybutadiene | 0 | |
| 4 | 6.3 | Kraton | FG1901 | maleic anhydride grafted SEBS | 30 | 71 |

TABLE 1-continued

| Example Number | Bond Strength Achieved with PP to Anodised Aluminium | Manufacturer | Product Name | Polymer Material | % S in Polymer | Hardness (shore A) |
|---|---|---|---|---|---|---|
| 5 | 3.0 | Kraton | FG1924 | maleic anhydride grafted SEBS | 13 | 49 |
| 6 | 5.7 | AKelastomers | M1913 | maleic anhydride grafted SEBS | 30 | 84 |
| 7 | 7.2 | Kraton | A1535 | S(EBS)S | 57 | 83 |
| 8 | 5.7 | Kraton | A1536 | S(EBS)S | 40 | 61 |
| 9 | 0.0 | Kraton | D1118 | SB | 33 | 64 |
| 10 | 0.0 | Kraton | D1116 | SBS | 23 | 63 |
| 11 | 0.0 | Kraton | D1155 | SBS | 31 | 87 |
| 12 | 8.1 | AKelastomers | H1517 | SEBS | 43 | 92 |
| 13 | 6.6 | Kraton | G1651 | SEBS | 31 | 70 |
| 14 | 5.7 | AKelastomers | H1041 | SEBS | 30 | 84 |
| 15 | 5.4 | Kraton | G1641 | SEBS | 33 | 58 |
| 16 | 5.1 | Kuraray | V9827 | SEBS | 30 | 78 |
| 17 | 5.0 | Kuraray | 8004 | SEBS | 31 | 80 |
| 18 | 4.7 | AKelastomers | H1051 | SEBS | 42 | 96 |
| 19 | 4.6 | DzBh | 502T | SEBS | 30 | 43 |
| 20 | 2.3 | Kraton | G1730 | SEP | 20 | 61 |
| 21 | 0.0 | Kraton | G1701 | SEPS | 37 | 64 |
| 22 | 0.0 | Kraton | D1170 | SIBS | 19 | 46 |
| 23 | 0.0 | Kraton | D1114 | SIS | 19 | 42 |

In Table 1 the "% S in polymer" is the percentage of polystyrene by weight in the polymer.

Example 1 (from Table 1) was the following formulation (the Polymer Material is the VAMAC material):

| Component | % |
|---|---|
| Xylene | 20.00 |
| MIBK | 9.30 |
| THFA | 7.80 |
| IBOA | 4.00 |
| VAMAC VCS5500 | 11.00 |
| HEMA Phosphate | 0.20 |
| MA | 1.50 |
| BMI | 0.10 |
| BCHTU | 0.80 |
| TPO | 0.70 |
| Irgacure 184 | 0.40 |

Examples 2 and 5 (from Table 1) were based on the following formulation. Only the Polymer Material differs between these Examples and the Example nos set out in Table 1 correspond to the following formulations with the Polymer Material being that indicated in Table 1 for the respective Examples.

| Component | % |
|---|---|
| MIBK | 43.01 |
| THFA | 16.77 |
| IBOA | 8.60 |
| Polymer Material | 23.66 |
| HEMA Phosphate | 0.43 |
| MA | 3.23 |
| BMI | 0.22 |
| BCHTU | 1.72 |
| TPO | 1.51 |
| Irgacure 184 | 0.86 |

Example 3 (from Table 1) was the following formulation (the Polymer Material is the Polytail material):

| Component | % |
|---|---|
| MMA | 51.61 |
| 2-HEMA | 16.77 |
| Polytail H | 23.66 |
| HEMA Phosphate | 0.43 |
| MA | 3.23 |
| BMI | 0.22 |
| BCHTU | 1.72 |
| TPO | 1.51 |
| Irgacure 184 | 0.86 |

Examples 4 and 6 to 23 were based on the following formulation. Only the Polymer Material differs between these Examples and the Example nos set out in Table 1 correspond to the following formulations with the Polymer Material being that indicated in Table 1 for the respective Examples.

| Component | % |
|---|---|
| Xylene | 33.06 |
| MIBK | 23.14 |
| THFA | 12.89 |
| IBOA | 6.61 |
| Polymer Material | 18.18 |
| HEMA Phosphate | 0.33 |
| MA | 2.48 |
| BMI | 0.17 |
| BCHTU | 1.32 |
| TPO | 1.16 |
| Irgacure 184 | 0.66 |

Figure 2:
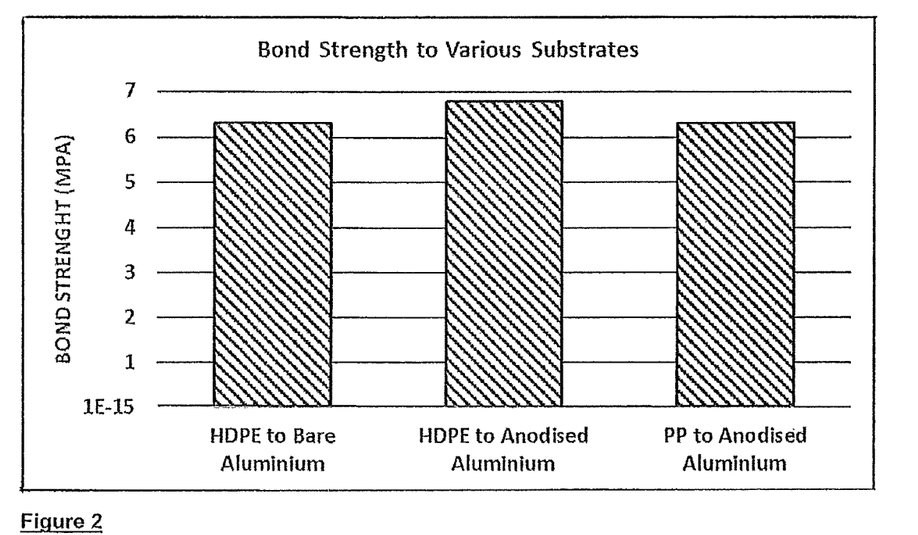
FIG. 2 is a graph showing the bonding results achieved with Example 4 from Table 1.

A graph showing further bonding results achieved with the composition of Example 4 on various combinations of substrates is shown in FIG. 2. The injection barrel temperature was 220° C.

Figure 3:
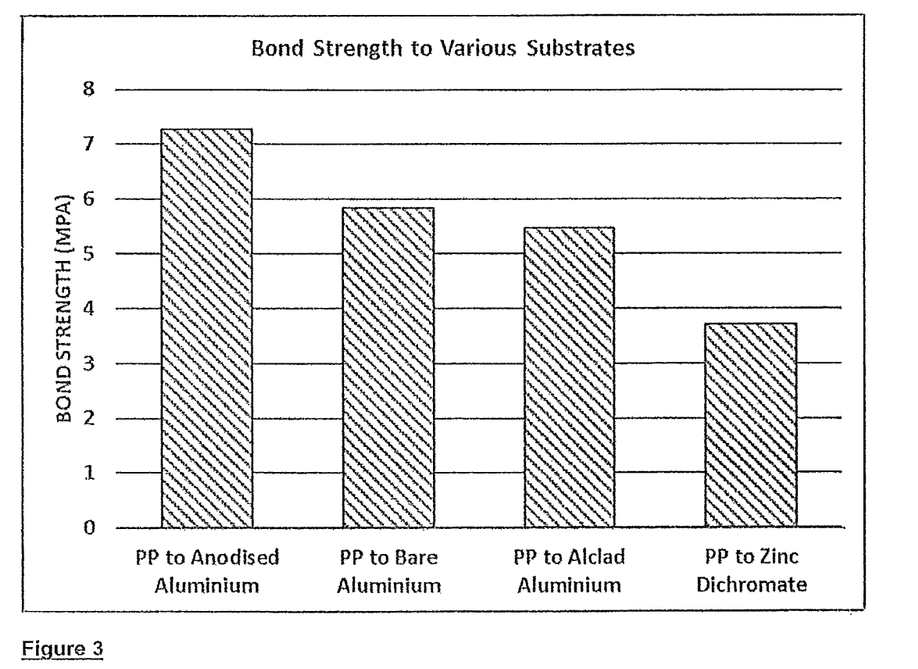
FIG. 3 is a graph showing the bonding results achieved with Example 7 from Table 1.

A graph showing further bonding results achieved with the composition of Example 7 on various combinations of substrates is shown in FIG. 3. The injection barrel temperature was 220° C.

In the Examples above:
THFA=Tetrahydrofurfuryl Acrylate;
IBOA=Isobornyl Acrylate;

FG1901 is a Maleic Anhydride Modified SEBS resin available from Kraton;

Polytail H is a polyhydroxy hydrogenated polybutadiene

HEMA Phosphate=Bis[2-(methacryloyloxy)ethyl] phosphate;

MA=methacrylic acid;

BMI=benzyl methyl imidazole;

BCHTU=Benzoyl cyclohexyl thiourea;

TPO=Diphenyl(2,4,6-trimethylbenzoyl)phosphine oxide-photoinitiator (as mentioned above) available from BASF;

Irgacure 184 (as mentioned above) is a photoinitiator available from BASF chemical name 1-Hydroxy-cyclohexyl-phenyl-ketone);

MIBK=methyl isobutyl ketone; and

A1535 is a SEBS resin available from Kraton.

Examples 1 to 3 are comparative examples. No bond strength is achieved.

Examples 9, 10, 11, 22 and 23 are comparative examples. No bond strength is achieved. In this respect it is important to note that the "B" in the acronym for the materials is used in a non-unique manner, for example in SB; SIBS; and SBS the "B" stands for a polymer based on butadiene whereas in SEBS and S(EBS)S the "B" stands for a polymer based on butylene.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A process for forming an injection molding about an article, comprising the steps of (a) disposing into an injection molding cavity an article about which a thermoplastic, plastic material is to be molded into a shape; and (b) injecting into the injection molding cavity in which is disposed the article, the thermoplastic material at a temperature and pressure to permit the material to flow around and about the article in the mold and maintaining the mold under a temperature and pressure appropriate to permit the thermoplastic material to solidify, wherein prior to disposition of the article, the article is primed with a curable primer composition of (a) a curable (meth)acrylate component; (b) a cure initiating component; and (c) a polymer material selected from the group consisting of: i. block polymers represented by S-A-S wherein S is polystyrene and A stands for a polymer or copolymer formed from one or more of ethylene, propylene, butylene and styrene, which are optionally substituted with carboxylic acid or maleic anhydride; provided that when A comprises styrene then A is a copolymer of styrene with at least one of ethylene, propylene and butylene, and is optionally substituted with carboxylic acid or maleic anhydride; and ii. polystyrene-poly(ethylene-propylene) ("SEP"); and iii. any combination of said polymer materials and exposed to radiation in the electromagnetic spectrum appropriate to cure the composition, wherein the polymer material comprises about 10 to about 70 weight percent styrene based on the total weight of the polymer material.

2. The process of claim 1, wherein the article is constructed from glass.

3. The process of claim 1, wherein the article is constructed from aluminium.

4. The process of claim 1, wherein the article is constructed from anodized aluminium.

5. The process of claim 1, wherein the polymer material is selected from the group consisting of block polymers represented by S-A-S where S is polystyrene and A stands for a polymer or copolymer formed from one or more of ethylene, propylene, butylene and styrene which are optionally substituted with carboxylic acid or maleic anhydride; provided that when A comprises styrene then A is a copolymer of styrene with at least one of ethylene, propylene and butylene, and is optionally substituted with carboxylic acid or maleic anhydride; and any combination of said polymer materials.

6. The process of claim 1, wherein A is formed from one or more of ethylene, propylene, butylene and styrene, provided that A is not formed from styrene alone.

7. The process of claim 1, wherein A is formed from at least two of ethylene, propylene, butylene and styrene.

8. The process of claim 1, wherein A is formed from at least three of ethylene, propylene, butylene and styrene.

9. The process of claim 1, wherein the material S-A-S is selected from: a. polystyrene-poly(ethylene-propylene)-polystyrene ("SEPS"); b. polystyrene-poly(ethylene-butylene)-polystyrene ("SEBS"); and c. polystyrene-poly(ethylene-butylene-styrene)-polystyrene ("S(EBS)S").

10. The process of claim 1, wherein A is substituted with carboxylic acid groups and/or maleic anhydride groups.

11. The process of claim 1, wherein A is substituted with maleic anhydride groups.

12. The process of claim 1, wherein the material S-A-S is at least one of a polystyrene-poly(ethylene-butylene)-polystyrene ("SEBS"); and b polystyrene-poly(ethylene-butylene-styrene)-polystyrene ("S(EBS)S").

13. The process of claim 1, wherein the material S-A-S is at least one of a polystyrene-poly(ethylene-butylene)-polystyrene ("SEBS"); and b polystyrene-poly(ethylene-butylene-styrene)-polystyrene ("S(EBS)S"); optionally substituted with carboxylic acid or maleic anhydride.

14. The process of claim 1, wherein the material S-A-S is at least one of a polystyrene-poly(ethylene-butylene)-polystyrene ("SEBS"); and b polystyrene-poly(ethylene-butylene-styrene)-polystyrene ("S (EBS)S"); substituted with maleic anhydride.

15. The process of claim 1, wherein the material S-A-S is at least one of: a. polystyrene-poly(ethylene-propylene)-polystyrene ("SEPS"); b. polystyrene-poly(ethylene-butylene)-polystyrene ("SEBS"); c. polystyrene-poly(ethylene-butylene-styrene)-polystyrene ("S (EBS) S"); and d. polystyrene-poly(ethylene-ethylene/propylene)-polystyrene ("SEEPS").

16. The process of claim 1, wherein the cure initiating component is a photoinitiator component.

17. The process of claim 1, wherein A is substituted with carboxylic acid groups.

18. The process of claim 1, wherein, in a B stage cure product of the composition, the material S-A-S is present in an amount from about 5% to about 80% based on the total weight of the composition.

19. The process of claim 1, wherein, in a B stage cure product of the composition, the material S-A-S is present in an amount from about 30% to about 60% by weight based on the total weight of the composition.

\* \* \* \* \*